H. H. McNAUGHTON.
CAMERA.
APPLICATION FILED JUNE 17, 1919. RENEWED DEC. 30, 1920.
1,381,722.  Patented June 14, 1921.
6 SHEETS—SHEET 2.
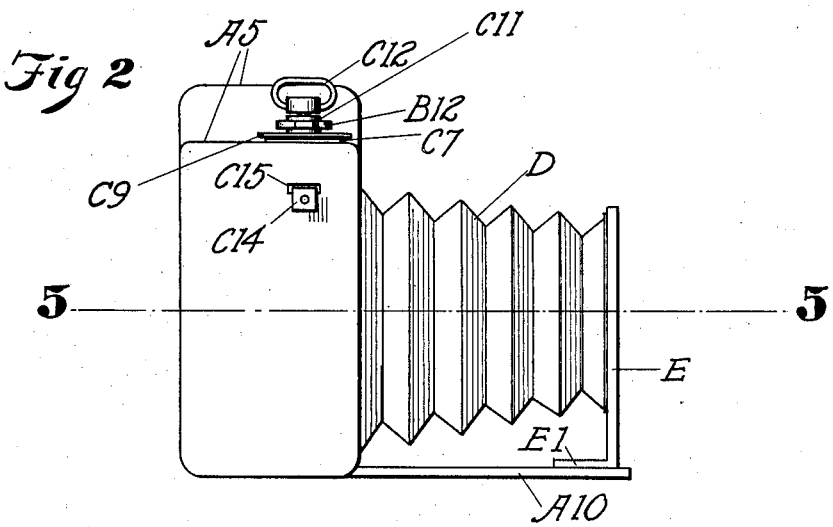
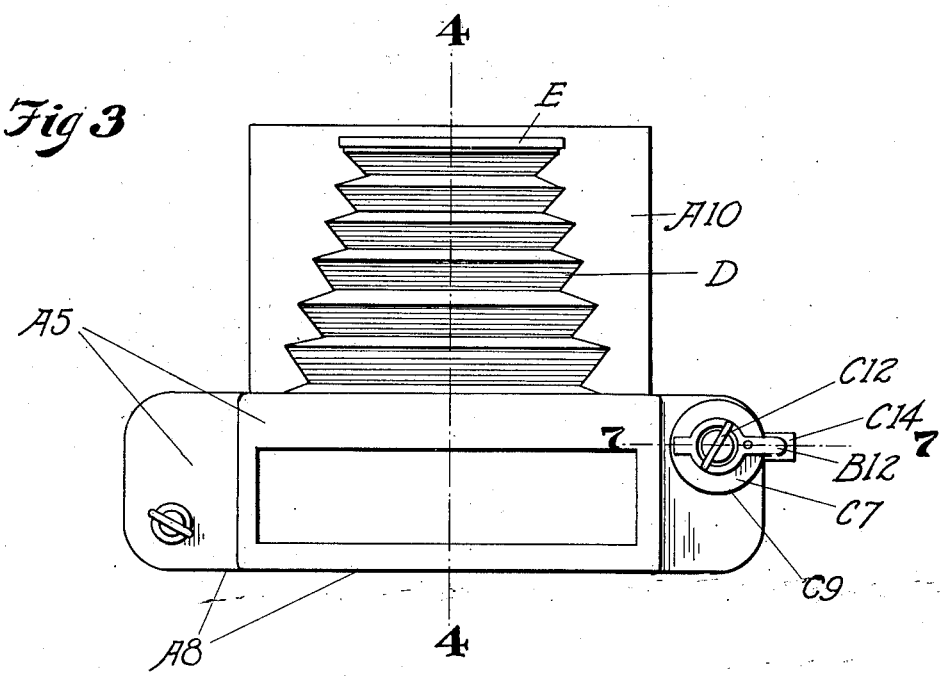

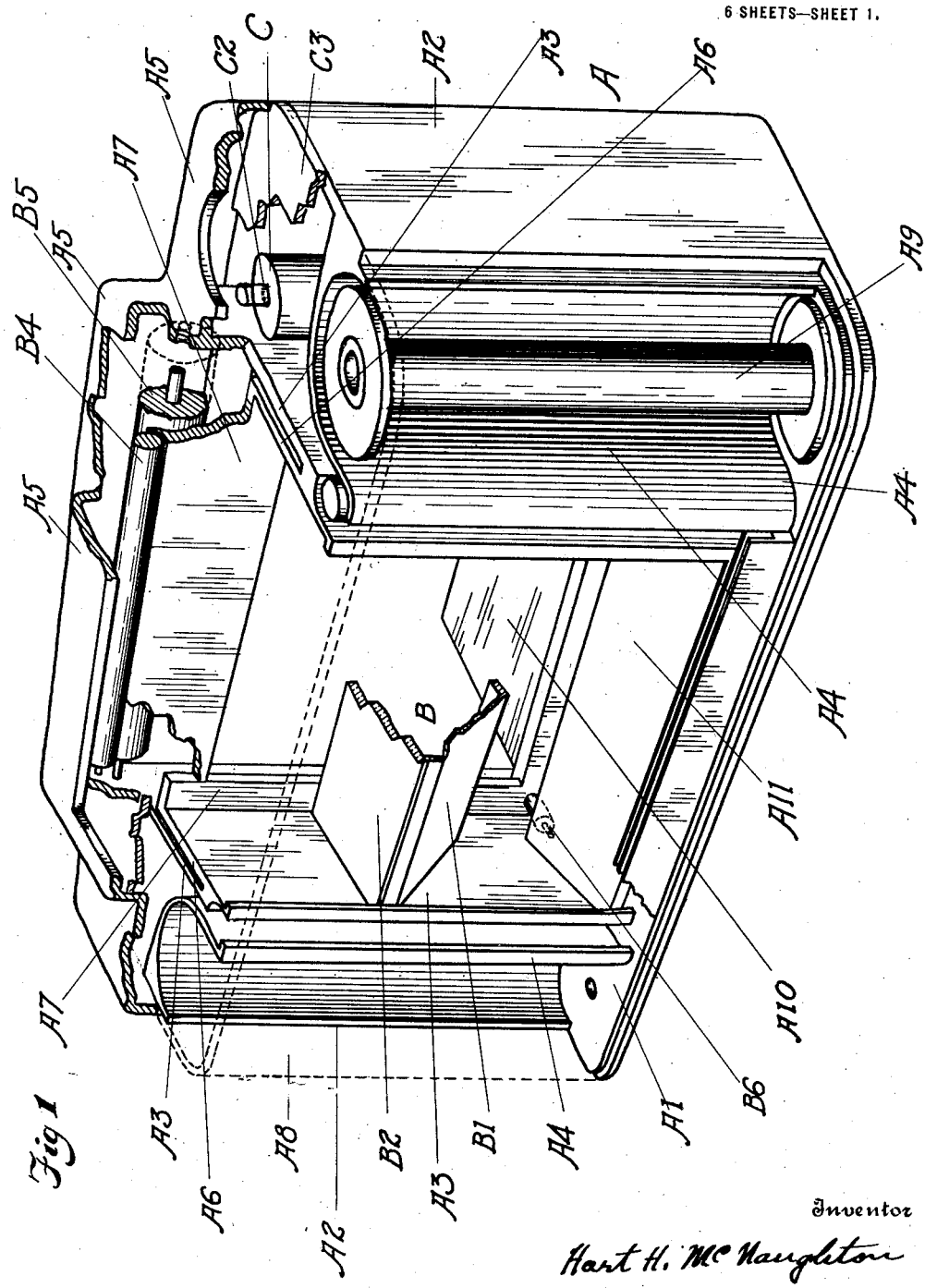

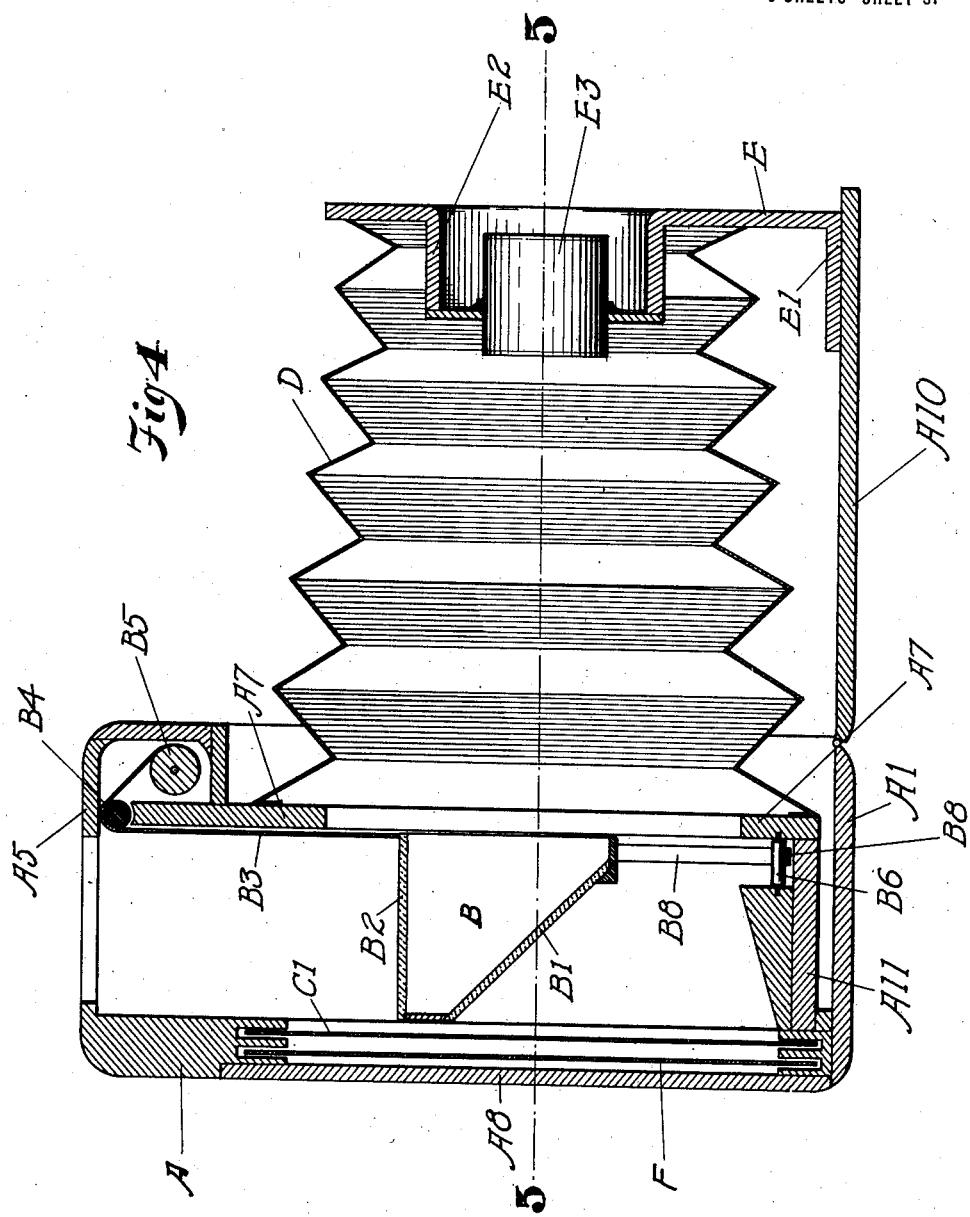

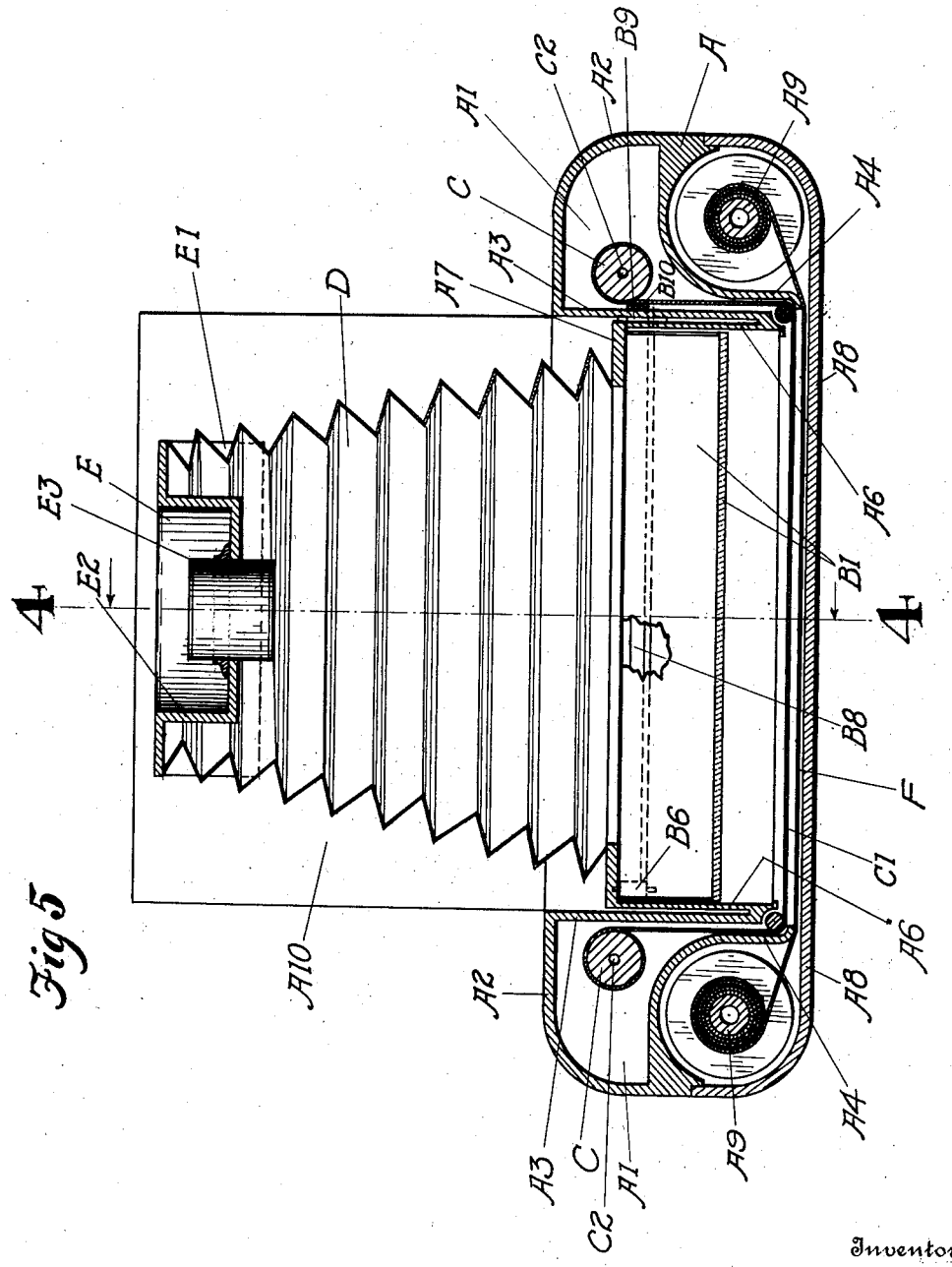

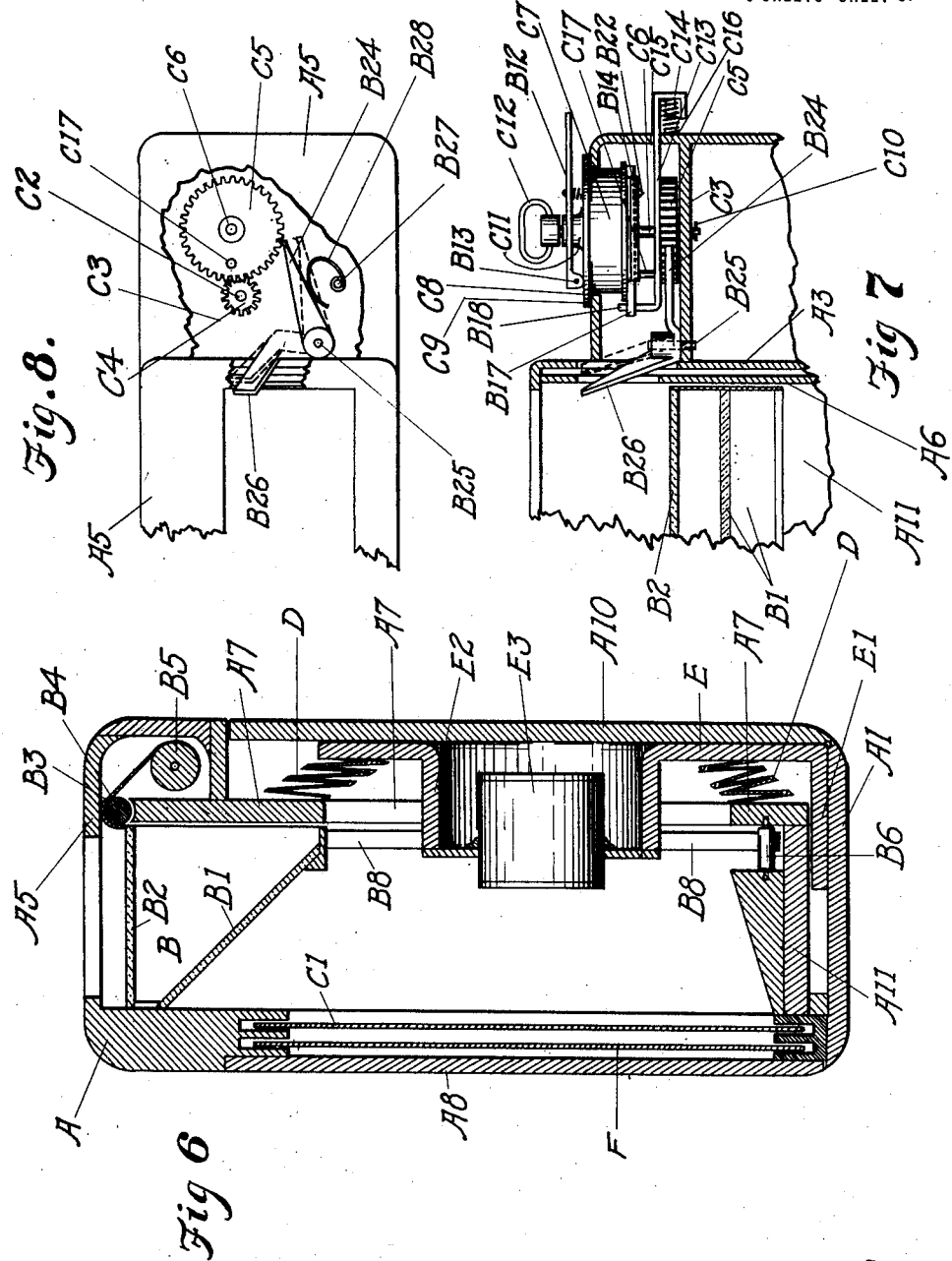

H. H. McNAUGHTON.
CAMERA.
APPLICATION FILED JUNE 17, 1919. RENEWED DEC. 30, 1920.
1,381,722.
Patented June 14, 1921.
6 SHEETS—SHEET 6.
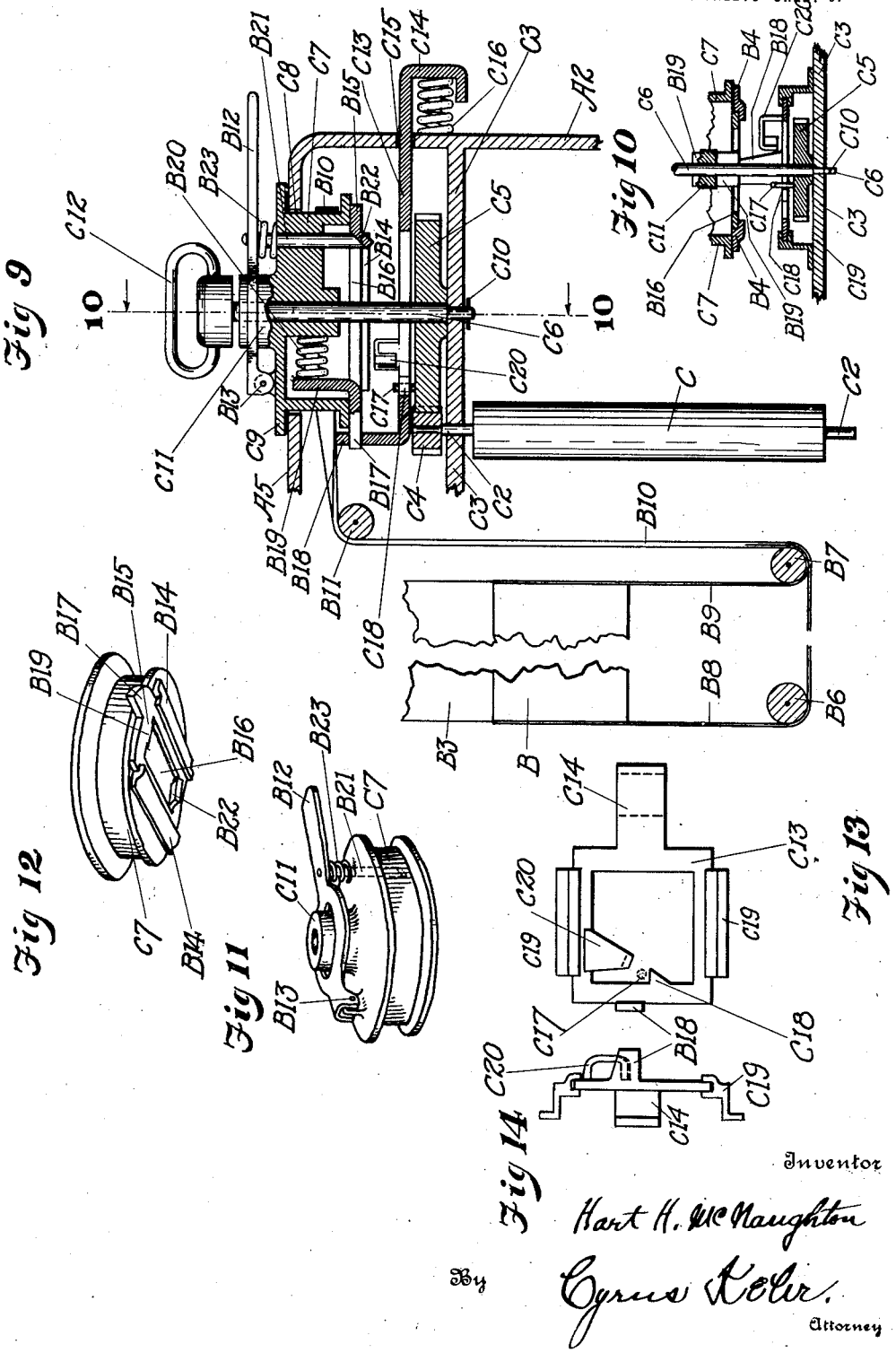
Inventor
Hart H. McNaughton
By
Cyrus Kehr
Attorney

UNITED STATES PATENT OFFICE.

HART H. McNAUGHTON, OF MARYVILLE, TENNESSEE.

CAMERA.

1,381,722.	Specification of Letters Patent.	Patented June 14, 1921.

Application filed June 17, 1919, Serial No. 304,824. Renewed December 30, 1920. Serial No. 434,112.

*To all whom it may concern:*

Be it known that I, HART H. McNAUGHTON, a citizen of the United States, residing at Maryville, in the county of Blount and State of Tennessee, have invented a new and useful Improvement in Cameras, of which the following is a specification, reference being had to the accompanying drawing.

My improvement relates particularly to means applied to cameras primarily for focusing and secondarily for finding what objects are at the time in the field of the camera.

The object of the invention is to provide in convenient form a ground glass and a reflector adapted to coöperate with the ground glass to place an image of a part of the field upon the ground glass, the ground glass and the mirror being joined to each other for movement in unison within a "well" which is located within the camera body and is parallel to and immediately in front of the negative plane. This mechanism may be associated with a curtain shutter located between the mechanism and the negative plane; and this form is herein shown and described.

My improvement makes it possible to closely observe the image upon the ground glass plate to the time of exposure. Thus adjustment of the lens carriage may be continued, if the object to be photographed is moving, to keep a well defined image on the ground glass until exposure is made.

In the accompanying drawings,

Figure 1 is a perspective view of the camera, the back having been removed and other portions broken away;

Fig. 2 is a side elevation, the bellows being extended ready for action;

Fig. 3 is a plan of the same camera;

Fig. 4 is an upright section on the line, 4—4 of Figs. 3 and 5, on a larger scale;

Fig. 5 is a horizontal section on the line, 5—5, of Figs. 2 and 4;

Fig. 6 is a section similar to Fig. 4, excepting that the camera is folded;

Fig. 7 is a section on the line, 7—7, of Fig. 3;

Fig. 8 is a plan of the part of the camera shown by Fig. 7, the upper part of the mechanism having been removed;

Fig. 9 is an upright sectional detail view similar to Fig. 7, and with some parts added;

Fig. 10 is an upright section on a part of the line, 10—10, of Fig. 9;

Fig. 11 is a perspective view of the drum shown in Figs. 7 and 9;

Fig. 12 is a perspective view of the same drum, showing its lower face, with certain parts added;

Fig. 13 is a plan of a controlling mechanism shown in Figs. 7 and 9;

Fig. 14 is a view of the mechanism shown in Fig. 13, looking toward the right.

A designates the rigid structure which constitutes the fixed body of the camera. $A^1$ is the base of said body. The upright walls, $A^2$, $A^3$ and $A^4$, rise from the base, $A^1$, and form a dark well or compartment to receive the curtain shutter reel, C. $A^5$ is the top wall of said body. This wall extends across the shutter reels or spools and also across the space between the reels. But in said wall is a rectangular opening to the well in which the shiftable structure comprising the reflector and the ground glass, to be hereinafter described, is located. Said well is formed in part by the rear wall of the body A, and two upright end walls, $A^6$, and an upright front wall, $A^7$, supplemented by the curtain, $B^3$, each wall, $A^6$, being near and parallel to one of the walls, $A^3$. The wall, $A^7$, has a rectangular light opening to which the interior edges of the bellows, D, are attached, said opening being large enough to make room for the light pyramid extending inward from the lens. A back cover, $A^8$, is applied across the rear of the body, A, to cover the film spools, $A^9$, and the part of the film, F, reaching from one film spool to the other. This cover is of ordinary construction.

The distance between the front and rear walls of the well is less than the height of the rectangular light opening in the front wall, $A^7$, of the well. The upright end walls, $A^6$, of the well meet the upright edges of the wall, $A^7$. Thus the horizontal measurement of the well transversely to the camera axis is the same as the corresponding measurement of the wall, $A^7$, and that measurement of the well is more than the horizontal measurement of the rectangular light opening in the wall, $A^7$, while the horizontal measurement of the well parallel to the camera axis is less than the height of the rectangular light opening. Thus reducing the cross-section of the well aids in darkening the well. Furthermore, this permits the use in the well of a reflecting structure or unit which is as long horizontally as the horizontal dimension of the light opening and which unit has a height less than the height of said light opening, as will be described further on.

The lens carriage door, $A^{10}$, is hinged by its lower edge to the front edge of the base, $A^1$. The lens carriage, E, is applied to said door in the usual manner, to slide outward to the exterior edge of said door and to slide inward far enough to permit the closing of the door. The bottom, $A^{11}$, of the well is located far enough above the base, $A^1$, to permit the foot, $E^1$, of the carriage to extend beneath said bottom wall. On the axial line of the camera, the carriage has a rearward extension, $E^2$, which supports the lens, $E^3$. This rearward extension is preferably rectangular in cross section. The purpose of said rearward extension is to permit closer folding of the camera, said extension and the lens reaching rearward into the "well" in which the reflecting unit is shiftably located, said unit being at the time in its elevated position to permit the lens and said rearward extension to enter the well.

B designates the reflecting structure or unit. This comprises a mirror, $B^1$, and a ground glass, $B^2$. The mirror is oblique and directed forward and upward and the ground glass is located above the mirror and is horizontal and fills the cross section of the well. In the reflecting unit, the mirror and the ground glass are joined in any convenient manner.

The reflecting unit is movable up and down in the well. When the camera is unfolded preparatory to making an exposure, said unit is to be lowered so as to bring the mirror into the axis of the camera, the mirror then reflecting light rays from the lens upward into the ground glass in the same relation as said rays would reach the film if the reflecting unit were raised out of range of the light pyramid. While the reflecting unit is in this position the image on the ground glass is to be observed by looking down into the well. When exposure is to be made, the reflecting unit is to be first moved upward. Then the shutter is to move in front of the film to make the exposure. With the reflecting unit I have associated mechanism for manually moving said unit downward into the observation position and for automatically and quickly moving the reflecting unit upward when an exposure is to be made. The latter means comprises a spring mechanism against the action of which the reflecting unit is forced downward into the observation position. Thus the upper position of said unit may be regarded as the rest or normal position, while the lower position is regarded as the temporary or observation position.

The reflecting unit is made large enough in its horizontal dimensions to fill the space within the well, allowance being made for bodily up and down movement of the structure. Since the upright end walls, $A^6$, of the well meet the upright edges of the wall, $A^7$, the length of the reflecting unit is sufficient to extend entirely across the rectangular light opening in the wall, $A^7$. But, since the distance between the walls, $A^7$, and the rear wall of the well is less than the height of said light opening, the horizontal dimensions of the reflecting unit parallel to the camera axis is less than the height of said light opening. Under these conditions, the placing of the mirror at its proper angle (45°) brings the upright dimensions of the reflecting unit less than the upright dimension or height of the light opening. This makes it possible to place the top of the reflecting unit—the ground glass, $B^2$—lower than the upper part of the light opening. The reflecting unit may ordinarily be moved downward into the axis of the camera; but said unit may be moved still farther down so that it will extend horizontally across the lower part of the light opening. The lower the reflecting unit is placed, the deeper and the darker will be the well. If the ground glass, $B^2$, were at rest at the upper limit of the light opening, the depth of the well would be limited accordingly and the ground glass would be correspondingly exposed to external light. The mechanism for controlling the movements of the reflecting unit permits moving said unit downward more and more to increase the strength of the image on the ground glass by reduction of light in the well above the ground glass. When such reduction of light above the ground glass has been made, the image will become sufficiently clear to guide the operator in moving the lens into focus position. When the reflecting unit is lowered to put the ground glass below the upper limit of the light opening, the curtain, $B^3$, by which the reflecting unit is suspended, forms a part of the walls of the well, said curtain supplementing the wall, $A^7$.

It will be observed that the ground glass of the reflecting unit will not receive the entire image transmitted through the light opening or the light pyramid. The image on the ground glass will be complete horizontally, but only a part of the height of the image will appear on the ground glass. For practical purposes this is sufficient. For focusing only a part of the image is needed, and for determining the field it is ordinarily sufficient to determine the limits in the horizontal direction. That can be done when the reflecting unit is at any height opposite the light opening of the wall, $A^7$.

The mechanism for raising said unit comprises a releasing member or trigger which is pressed by the operator. The curtain shutter is released by the reflecting unit during the latter part of the upward movement of said unit, as will be hereinafter described.

The film spools are applied and actuated in the usual manner. The spools or reels, C, are of ordinary form and to them is applied the curtain shutter, $C^1$, also of ordinary form.

The left hand shutter reel, C, is a spring actuated roller similar to the ordinary window shade roller, which automatically winds the curtain. The left hand reel, C, is turned manually to wind the curtain thereon, drawing the latter from the other reel.

In my improved mechanism the right hand reel, C, has its shaft, $C^2$, projecting upward through a horizontal partition, $C^3$, located below the top wall, $A^5$. On said shaft, above said partition is a small spur gear wheel, $C^4$, which meshes with a larger spur gear wheel, $C^5$, which is keyed on the upright shaft, $C^6$, which has its lower end journaled in the partition, $C^3$, and which extends upward through a drum, $C^7$, which is seated for rotation in a bearing, $C^8$, which is an opening in the top wall, $A^5$. Above said top wall said drum has a flange, $C^9$, which rests upon the outer face of said wall. Below the partition, $C^3$, the shaft, $C^6$, has a cross pin, $C^{10}$, which bears against the lower face of said partition and prevents said shaft from rising. In the upper end of the drum is a hub, $C^{11}$, in which the shaft, $C^6$, rests rotatably, so that said shaft may be turned without turning the drum. Thus the rotation of the shaft will accomplish nothing more than the turning of the larger spur gear wheel, $C^5$. The upper end of said shaft projects above said hub and there supports a finger piece, $C^{12}$, which is to be engaged by the operator for turning the shaft for winding the adjacent shutter reel. The spur gear wheels, $C^5$ and $C^4$, are to be so proportioned as that one turn of the wheel, $C^5$, will turn the wheel, $C^4$, often enough to fully wind said shutter upon said reel.

Immediately above the spur gear wheels is a locking plate, $C^{13}$, which forms engagement with the wheel, $C^5$, to prevent rotation of the latter after the shutter has been wound on the adjacent shutter reel. Said locking plate is of rectangular form with an extension, $C^{14}$, reaching through a slot, $C^{15}$, in the adjacent upright wall, $A^2$. Said extension is turned downward, and between the part thus turned downward and the wall, $A^2$, is an expanding coiled spring, $C^{16}$, which tends to move said locking plate toward said wall. Said plate is cut away between its edges to form an open space around the shaft, $C^6$. On the wheel, $C^5$, is an upright stud, $C^{17}$, which is normally engaged by a lug, $C^{18}$, formed on the plate, $C^{13}$, whereby the wheel, $C^5$, is prevented from rotating. The right and left edges of the plate, $C^{13}$, are held in chairs, $C^{19}$, seated rigidly on the cross partition, $C^3$. (Fig. 10.) When the extension, $C^{14}$, is pressed inward against the resistance of the spring, $C^{16}$, the lug, $C^{18}$, is moved out of engagement with the stud, $C^{17}$, whereby the spur gear wheel, $C^5$, is released. Said wheel would be free to rotate more than once if not hindered by the arm, $C^{20}$. Said arm is formed on the plate, $C^{13}$, and extends downward into the path of the stud, $C^{17}$, when the plate, $C^{13}$, has been pushed inward. Thus said arm forms a stop for the stud, $C^{17}$, when the latter has nearly traversed its path; and said stud is so held until the extension, $C^{14}$, is released by the operator. Whereupon the plate, $C^{13}$, is moved outward by the spring, $C^{16}$. When the stud becomes released from said arm, the lug, $C^{18}$, is already in the path of said stud and again arrests the latter. Thus the wheel, $C^5$, is always prevented from making more than one full rotation.

The reflector unit is suspended by a curtain, $B^3$, the lower edge of said curtain being attached to the forward upper part of said unit and said curtain extending upward over a bar, $B^4$, and then around a spring roller, $B^5$, which is similar to a spring-actuated window shade roller, said roller, $B^5$, tending constantly to wind said curtain upon the roller.

In the left hand end of the bottom of the well is a guide pulley, $B^6$, and in the right hand end of said bottom is a guide pulley, $B^7$, each of said pulleys having a horizontal axis. A cord or band, $B^8$, extends from the left hand end of the reflector unit downward around the pulley, $B^6$, and thence horizontally to and around the pulley, $B^7$. A cord or band, $B^9$, extends from the right hand end of the reflector unit downward to and around the pulley, $B^7$. After having passed the pulley, $B^7$, said bands, $B^8$ and $B^9$, are joined to a band, $B^{10}$, which extends upward and over a guide pulley, $B^{11}$, and thence horizontally to and around the drum, $C^7$. By turning the drum in the proper direction, the band, $B^{10}$, is wound upon said drum, whereby the bands, $B^8$ and $B^9$, are drawn downward, whereby the reflector unit is drawn downward against the resistance of the spring roller, $B^5$, the curtain, $B^3$, unwinding from said roller and forming a part of the walls of the well.

The drum is to be turned independently of the shaft, $C^6$, and the spur gear wheel, $C^5$. The operator does this by engaging the free end of the lever, $B^{12}$, which loosely surrounds the hub, $C^{11}$, and has its other end hinged to an ear, $B^{13}$, rising from the drum.

To the lower face of the drum is applied a slide plate, $B^{15}$, which has a slot, $B^{16}$, through which the shaft, $C^6$, extends. Guide plates, $B^{14}$, are attached to the lower face of the drum at opposite sides of the plate, $B^{15}$, to hold the latter for horizontal reciprocation. One end of said slide plate has a projection, $B^{17}$, which normally stands so as to have a path in which normally stands a finger, $B^{18}$, rising rigidly from the locking plate, $C^{13}$, so that when said locking plate is in its normal position, holding the wheel, $C^5$, against rotation, the finger, $B^{18}$, will, by engaging the projection, $B^{17}$, hold the drum against rotation. A rigid tongue, $B^{19}$, extends upward from the slot, $B^{16}$, between the projection, $B^{17}$, and the shaft $C^6$; and an expanding coiled spring, $B^{20}$, is seated between said tongue and the adjacent part of the hub, $C^{11}$, and tends to press the slide plate, $B^{15}$, to move in the proper direction to shift the projection, $B^7$, away from the shaft, $C^6$, into position to engage the finger, $B^{18}$. Thus the wheel, $C^5$, and the drum, $C^7$, are adapted to become locked automatically when the operator releases the extension, $C^{14}$; and the drum, $C^7$, is adapted to be released when the operator depresses the lever, $B^{12}$.

Under the free end of the lever, $B^{12}$, is an upright reciprocable stem, $B^{21}$, seated in the drum. The upper end of said stem is secured to the lever, and the lower end is tapered and bears against an inclined face, $B^{22}$, formed in the adjacent end of the slot, $B^{16}$, of the slide plate, $B^{15}$, and directed toward the shaft, $C^6$. An expanding coiled spring, $B^{23}$, surrounds the stem, $B^{21}$, between the drum and the lever, $B^{12}$, and tends to lift the latter.

When the lever, $B^{12}$, is depressed, the stem, $B^{21}$, is forced downward against the inclined face, $B^{22}$, and that causes the shifting of the plate, $B^{15}$, so as to move the projection, $B^{17}$, out of engagement with the finger, $B^{18}$. Then the drum may be turned for winding the cord or band, $B^{10}$, upon the drum to draw the reflector unit downward. When said arm has been depressed sufficiently to release the drum, the free end of the arm may be moved in an orbital path, whereby the drum is turned. By this manipulation of the lever, the drum may be turned backward and forward, whereby the reflector unit is moved upward and downward into different positions to bring different parts of the image upon the reflector and the ground glass, the width of the mirror being less than the corresponding dimension of the image field.

But the several parts are to be so proportioned as to bring the middle of the mirror on the camera axis when the drum is locked through engagement between the projection, $B^{17}$, and the finger, $B^{18}$.

From the foregoing it will be seen that when the extension, $C^{14}$, is pressed inward, the wheel, $C^5$, is released from the locking plate, $C^{13}$, and the drum, $C^7$, is made free by the movement of the finger, $B^{18}$, carried by the plate, $C^{13}$, out of engagement with the projection, $B^{17}$.

But the shutter must be held against movement until the drum has rotated sufficiently to allow the roller, $B^5$, to wind the curtain, $B^3$, sufficiently to lift the reflector unit above the light pyramid.

For this purpose I apply to the cog wheel, $C^5$, a pawl which normally holds the wheel, $C^5$, against turning in the direction to permit backward winding of the curtain shutter. Such a pawl is designated by $B^{24}$. This is pivoted on an upright post, $B^{25}$, rising from the horizontal partition, $C^3$, adjacent the well in which the reflector unit travels. A spring, $B^{28}$, secured to a post, $B^{27}$, rising from the partition, $C^3$, yieldingly presses the pawl toward the wheel, $C^5$. Rigid with the pawl is an arm, $B^{26}$, at the side of the post, $B^{25}$, opposite the pawl and extending into the upper part of the path of the reflector unit.

Regardless of the release of the wheel, $C^5$, when the operator presses the extension, $C^{14}$, inward, the pawl, so long as it is in engagement with the wheel, $C^5$, holds said wheel against rotation. Hence, when the extension, $C^{14}$, and the plate, $C^{13}$, are pressed inward, the finger, $B^{18}$, is released from the projection, $B^{17}$, and the drum is free to rotate and does so in response to the strain exerted by the spring roller, $B^5$. Thus the reflector unit moves upward while the movement of the shutter is prevented by the pawl, $B^{24}$. Immediately upon the arrival of the reflector unit at a height clearing the light pyramid, said unit engages the arm, $B^{26}$, and pushes the latter sidewise, whereby the pawl, $B^{24}$, is moved away from the wheel, $C^5$, against the resistance of the spring, $B^{28}$, and the curtain shutter is free for backward winding by the automatic action of the left hand shutter reel, $C$.

It is to be observed that the curtain, $B^3$, has two functions: to support the reflector unit and to form a part of the walls of the well when said unit is lowered. In the latter capacity said curtain excludes from the well light which passes through the lens into the bellows, to the end that the well may be sufficiently dark to permit the presentation of a distinct image on the ground glass.

I claim as my invention,

1. In a camera, the combination of upright walls forming a well, the forward of said walls having a light opening, and a reflecting unit movable up and down in said well and having a height less than the height of said light opening, substantially as described, 2. In a camera, the combination of upright walls forming a well, the forward of said walls having a light opening, a reflecting unit movable up and down in said well and having a height less than the height of said light opening, a shutter, and automatic mechanism for first lifting said unit and next operating said shutter, substantially as described.

3. In a camera, the combination of upright walls forming a well, the forward of said walls having a light opening, a reflecting unit movable up and down in said well and having a height less than the height of said light opening, and a curtain movable up and down along the rear face of said forward wall and having its lower edge joined to said reflecting unit, substantially as described.

4. In a camera, upright walls forming a well extending across and above the light pyramid, the forward wall having a light opening and the forward and rear walls being separated from each other a distance less than the height of said light opening, a reflecting unit located within said well and having a height less than the height of said light opening, manually-operated means for moving said unit into the light pyramid, spring-actuated means for moving said unit out of the light pyramid, a shutter, and means for actuating the shutter, substantially as described.

5. In a camera, upright walls forming a well extending across and above the light pyramid, the forward wall having a light opening and the forward and rear walls being separated from each other a distance less than the height of said light opening and the distance between the upright side walls being greater than the width of the light opening, a reflecting unit located within said well and having a height less than the height of said light opening, manually-operated means for moving said unit into the light pyramid, spring-actuated means for moving said unit out of the light pyramid, a shutter, and means for actuating the shutter, substantially as described.

6. In a camera, upright walls forming a well extending across and above the light pyramid, the forward wall having a light opening and the forward and rear walls being separated from each other a distance less than the height of said light opening, a reflecting unit located within said well and having a height less than the height of said light opening, manually-operated means for moving said unit into the light pyramid, spring-actuated means for moving said unit out of the light pyramid, a shutter, and shutter-actuating means in operative relation with said unit, substantially as described.

7. In a camera, upright walls forming a well extending across and above the light pyramid, the forward wall having a light opening and the forward and rear walls being separated from each other a distance less than the height of said light opening and the distance between the upright side walls being greater than the width of the light opening, a reflecting unit located within said well and having a height less than the height of said light opening, manually-operated means for moving said unit into the light pyramid, spring-actuated means for moving said unit out of the light pyramid, a shutter, and shutter-actuating means in operative relation with said unit, substantially as described.

8. In a camera, upright walls forming a well extending across and above the light pyramid, the forward wall having a light opening and the forward and rear walls being separated from each other a distance less than the height of said light opening, a reflecting unit located within said well and having a height less than the height of said light opening, manually-operated means for moving said unit into the light pyramid, spring-actuated means for moving said unit out of the light pyramid, a shutter, and shutter-actuating means extending into the path of said unit, substantially as described.

9. In a camera, upright walls forming a well extending across and above the light pyramid, the forward wall having a light opening and the forward and rear walls being separated from each other a distance less than the height of said light opening and the distance between the upright side walls being greater than the width of the light opening, a reflecting unit located within said well and having a height less than the height of said light opening, manually-operated means for moving said unit into the light pyramid, spring-actuated means for moving said unit out of the light pyramid, a shutter, and shutter-actuating means extending into the path of said unit, substantially as described.

10. In a camera, upright walls forming a well extending across and above the light pyramid, the forward wall having a light opening and the forward and rear walls being separated from each other a distance less than the height of said light opening, a reflecting unit located within said well and having a height less than the height of said light opening, manually-operated means for moving said unit into the light pyramid, spring-actuated means for moving said unit out of the light pyramid, a curtain shutter located between said well and the negative plane, and means for actuating the shutter, substantially as described.

11. In a camera, the combination of fixed walls and a suspension and carrying curtain forming a well, a reflecting unit located within said well and supported and carried bodily by said curtain, substantially as described.

12. In a camera, the combination of upright walls forming a well, the forward of said walls having a light opening, a reflecting unit movable bodily up and down in said well, a lens carriage door forward of said forward wall, a lens carriage adapted to be moved outward on said door when the latter is open, said carriage comprising an upright part adapted to fold against said forward wall and having a rearward extension adapted to extend through said light opening into said well when said carriage is in the folded position and the reflecting unit is in its upper position, substantially as described.

In testimony whereof I have signed my name, this 16th day of May, in the year one thousand nine hundred and nineteen.

HART H. McNAUGHTON.